United States Patent Office 3,471,446
Patented Oct. 7, 1969

3,471,446
SULFONATE MODIFIED COPOLYESTERS
CONTAINING AMINES
Allan Kenneth Delves, Anthony Julian East, Michael King McCreath, and John Francis Lloyd Roberts, Harrogate, England, assignors to Imperial Chemical Industries Limited, London, England, a corporation of Great Britain
No Drawing. Filed July 23, 1965, Ser. No. 474,510
Claims priority, application Great Britain, July 27, 1964, 29,892/64
Int. Cl. C08g 39/06
U.S. Cl. 260—75   3 Claims

ABSTRACT OF THE DISCLOSURE

A film- or fiber-forming copolyester in which a minor proportion of the structural units are organic radicals containing at least one sulfonate group in the form of a metal salt and in which is also incorporated a minor amount of a basic, nitrogenous, organic compound.

This invention relates to improved copolymers and to improved fibres and films formed from copolyesters. Moare particularly, this invention relates to polyester fibres and films of improved substantivity towards acid dyestuffs, basic dyestuffs and dispersed dyestuffs.

According to the present invention, we provide an improved, modified film- or fibre-forming copolyester in which a minor proportion of the structural units are organic radicals containing at least one sulfonate group in the form of the metal salt and in which is also incorporated a minor amount of a basic, nitrogenous, organic compound.

According to the present invention, we also provide an improved film or fibre formed from a copolyester in which a minor proportion of the structural units are organic radicals containing at least one sulfonate group in the form of the metal salt, said film or fibre having incorporated therein a minor amount of a basic, nitrogenous organic compound.

The modified copolyesters of our invention possess substantivity towards basic dyestuffs, acid dyestuffs and disperse dyestuffs. The substantivity towards acid dyestuffs is not possessed by the modified copolyesters of which a portion of the structural units are organic radicals containing a sulfonate group but not having a basic, nitrogenous organic compound incorporated therein. The substantivity towards basic dyestuffs possessed by the modified copolyesters of our invention is superior to that of polyesters containing no structural units containing a sulfonate group but having incorporated therein a minor amount of basic, nitrogenous, organic compound.

The limits of the proportion of the structural units which may be substituted by a sulfonate group or groups should preferably be from 0.5 to 10 moles percent.

Expressing the content of basic, nitrogenous compound as a basic nitrogen content expressed as a percentage by weight of the final mixture, a figure of approximately 0.1% is required for useful effect: above a figure of approximately 0.8%, difficulty is experienced during processing the copolyester.

The modified copolyester of our invention may be made by a variety of methods of which the following may be taken as examples:

(a) The reaction of a dicarboxylic acid with a diol and a minor proportion of a sulfonated dicarboxylic acid or a sulfonated diol; the metal salt of the sulfonate group may be formed before, during or after the polyester-forming reaction.

(b) The reaction of more than one dicarboxylic acid with a diol, or more than one diol with a dicarboxylic acid, in the presence of a minor proportion of a sulfonated dicarboxylic acid or a sulfonated diol; the metal salt of the sulfonate group may be formed before, during or after the polyester forming reaction.

(c) The preparation of a low-molecular weight polyester or co-polyester free from structural units bearing a sulfonate group, followed by the addition to the reaction mixture of a sulfonated dicarboxylic acid, a sulfonated diol or a low molecular weight polyester containing structural units which are substituted with at least one sulfonate group and further polycondensation to yield the desired molecular weight.

For the dicarboxylic acids or diols in (a), (b) or (c) may be substituted suitable derivatives which are known for the preparation of polyesters.

In the preparation of the copolyester, a proportion of the dicarboxylic acid may be substituted by a hydroxycarboxylic acid or more than one dicarboxylic acid may be employed.

Suitable dicarboxylic acids for use in the preparation of the products of our invention are, for example, terephthalic acid and bis(para-carboxyphenoxy)ethane. Examples of dicarboxylic acids which may be employed conjointly with the main dicarboxylic acid in preparing the products of our invention are isophthalic acid, adipic acid and sebacic acid.

More than one glycol may be employed in the preparation of the products of our invention. Among glycols suitable for the preparation of the products of our invention may be mentioned glycols of the formula $HO(CH_2)_nOH$ where $n$ is not less than 2 and not greater than 10 and 1:4-bis(hydroxymethyl)cyclohexane.

The basic, nitrogenous, organic compound may be incorporated into the copolyesters at any stage in the preparation of the copolyeser or its formation into shaped articles or thereafter. For example:

(i) The basic, nitrogenous, organic compound may be added together with any of the raw materials for the formation of the copolyester or during their reaction; preferably it should be added in the later stages of the polycondensation in order to avoid discolouration of the resultant polymer. This method is convenient since it avoids a separate stage of treatment.

(ii) The basic, nitrogenous, organic compound may be added to the copolyester, which may then either be directly formed into shaped articles or converted into a convenient solid form which may later be remelted for formation into shaped articles. This represents a compromise between method (i) involving a longer time of contact of basic, organic, nitrogenous compound with copolyester and method (iii) wherein separate equipment is required.

(iii) The basic, nitrogenous, organic compound may be applied to the molten stream of copolyester whilst it is being formed into shaped articles. This has the advantage that the basic, nitrogenous organic compound is in contact with molten copolyester for a short time only, and undesirable side effects are less likely.

(iv) The basic, nitrogenous, organic compound may be applied to the shaped articles, either as such or during or after further processing, for example, in the form of textiles.

In order that our invention may be the more completely understood, we give hereinafter an example of a method in which our invention may be put into practice. This example, in which all parts and percentages are by weight, is not intended to limit the scope of our invention in any way.

Example 1

A copolyester was prepared by heating together dimethylterephthalate, ethylene glycol and the sodium salt of dimethyl-5-sulphoisophthalate under ester-interchange conditions in the presence of calcium acetate as ester-interchange catalyst. After completion of the ester-interchange reaction, the reaction mixture was further heated under polycondensation conditions in the presence of antimony trioxide as polycondensation catalyst to give a high-molecular weight product. The resultant copolyester contained 2 percent molar proportion of 5-sulphoisophthalate sodium salt units. The Intrinsic Viscosity of the copolyester was 0.577 as measured at 25° C. in orthochlorophenol at 1 percent concentration by weight. The softening point of the copolyester was 251° C. The copolyester was spun at 270° C. through a 3-hole spinneret at 1.3 g. per minute, the threadline being wound up at a speed of 1000 feet per minute.

To the threadline, at a point 3 inches below the external face of the spinneret, that is in the region of the threadline where the copolyester of which it was composed was still molten, was continuously applied 2-diethylaminoethyl nicotinate by gentle contact by the threadline with a wick to which the 2-diethylaminoethyl nicotinate was continuously fed by capillarity. The wick was in close contact with a heated metal surface at a temperature of 80° C.

The resultant fibres were drawn over a hot plate at 125° C. with a draw-ratio of 3.5:1 to give strong fibres of good colour (hereinafter referred to as Product I).

By way of comparison, polyethylene terephthalate polymer of intrinsic viscosity 0.67, as measured, at 25° C. in 1 percent solution in orthochlorophenol, was melt spun at 285° C. and 2-diethylaminoethyl nicotinate applied to it exactly as in the foregoing description for Product I. This product is hereinafter referred to as Product II.

By way of further comparison, a yarn was obtained which contained 2 percent molar concentration of sodium-5-sulphoisophthalate units. This product is hereinafter referred to as Product III.

The above described yarns (0.5 g. hank) were each subjected to dyeing for 1 hour at the boiling point at atmospheric pressure in each of the following dyebaths.

(a) 100 ml. of 0.1 percent aqueous solution of the dyestuff of Colour Index Acid Red 266, containing 0.5 ml. of glacial acetic acid.

(b) 100 ml. of 0.1 percent aqueous solution of the dyestuff of Colour Index Basic Green 4.

After dyeing, the hanks were scoured for 20 minutes at 60° C. in a 0.2 percent aqueous solution of sodium carbonate containing 0.1 percent of a mixture of sodium oleyl sulphate and sodium cetyl sulphate.

Visual inspection of the hanks of dyed yarn gave the results as given in the table hereinafter:

| Type of Yarn | Method of Dyeing | Appearance of Hank After Dyeing |
|---|---|---|
| Product I | (a) | Deep Red Shade. |
| Do. | (b) | Deep Green Shade. |
| Product II | (a) | Medium Red Shade. |
| Do. | (b) | Pale Green Shade. |
| Product III | (a) | As before dyeing. |
| Do. | (b) | Medium Green Shade. |

Thus it can be seen that the product of our invention has superior substantivity both to fibres from a polyester containing structural units which are organic radicals containing a sulfonate group in the form of the metal salt and to fibres of a polyester in which is incorporated a nitrogenous organic compound.

Example 2

Dimethyl terephthalate (12,000 parts), ethylene glycol (9,000 parts) and the sodium salt of dimethyl-5-sulphoisophthalate (420 parts) were heated together under ester-interchange conditions in the presence of manganese acetate (6 parts) as ester-interchange catalyst. After completion of the ester-interchange reaction, the catalyst was inactivated by the addition of triphenyl phosphate (16.8 parts). The reaction mixture was further heated under polycondensation conditions at 285° C. at a pressure of 0.2 mm. of mercury in the presence of antimony trioxide (4.8 parts) as polycondensation catalyst. After 50 minutes a high-molecular weight product was obtained. The resultant copolyester was extruded from the reactor and cooled rapidly. The intrinsic viscosity of the copolyester was 0.80 as measured at 25° C. in orthochlorophenol at 1 percent concentration by weight. The softening point of the copolyester was 220° C. The solid copolyester was finely milled and ground together with 5% of its weight of recrystallised tribenzylamine. The mixture was tumbled for 24 hours to effect thorough mixing, dried, candled at 210° C. and melt-spun at 240° C. using a wind-up speed of 1,000 feet per minute.

The resultant fibres were drawn over a hot plate at 100° C. with a draw-ratio of 4.5:1 to give strong, lustrous, crystalline, oriented fibres of good colour (hereinafter referred to as Product IV).

By way of comparison, polyethylene terephthalate was prepared in the usual manner using the same catalyst system as for the copolyester described in this example. The polymer had intrinsic viscosity 0.67, as measured at 25° C. in 1 percent solution in orthochlorophenol, was milled and ground and tumbled with 5% of its weight of tribenzylamine as hereinbefore described. The resultant mixture was melt-spun as hereinbefore described for Product IV. This product is hereinafter referred to as Product V.

By way of further comparison, the yarn designated Product III in Example 1 was used.

The above described yarns (0.5 g. hank) were each subjected to dyeing for 1 hour at the boiling point at atmospheric pressure in each of the following dyebaths.

(a) 100 ml. of 0.1 percent aqueous solution of the dyestuff of Colour Index Acid Red 266, to which was added 0.5 ml. of glacial acetic acid.

(b) 100 ml. of 0.1 percent aqueous solution of the dyestuff of Colour Index Basic Green 4.

(c) As (a) with the further addition of 0.5 g. of orthophenyl phenol.

After dyeing, the hanks were scoured for 20 minutes at 60° C. in a 0.2 percent aqueous solution of sodium carbonate containing 0.1 percent of a mixture of sodium oleyl sulphate and sodium cetyl sulphate.

Visual inspection of the hanks of dyed yarn gave the results as given in the Table 2.

TABLE 2

| Type of yarn | Method of dyeing | Appearance of Hank after dyeing |
|---|---|---|
| Product II | (a) | Unaffected. |
| Product III | (b) | Medium green. |
| Product IV | (a) | Pale red. |
| Do. | (b) | Deep green. |
| Do. | (c) | Deep red. |
| Product V | (a) | Unaffected. |
| Do. | (c) | Medium red. |

What we claim is:

1. An admixture of (A) a film- or fiber-forming copolyester of (1) a dicarboxylic acid (2) at least one glycol and (3) a metal salt of 5-sulphoisophthalic acid and (B) an amine selected from the group consisting of 2-diethylamino-ethyl nicotinate and tribenzyl amine, said amine being in proportion to the copolyester such that the content of basic nitrogen provided by said amine in the admixture is from 0.1 to 0.8 percent by weight of the admixture.

2. The admixture of claim 1 wherein the dicarboxylic acid is terephthalic acid and the glycol is ethylene glycol.

3. The admixture of claim 1 wherein the metal salt of 5-sulphoisophthalic acid is the sodium salt thereof and wherein said sodium salt is present in amounts sufficient to provide 0.5 to 10 mole percent of the total structural units of the copolyester.

References Cited

UNITED STATES PATENTS 3,123,587 3/1964 Hogsep _____ 260—755
3,018,272 1/1962 Griffing et al.
3,060,152 10/1962 Ringwald.
3,164,570 1/1965 Horn.
3,381,058 4/1968 Caldwell et al. ____ 260—75 XR WILLIAM H. SHORT, Primary Examiner E. NIELSEN, Assistant Examiner U.S. Cl. X.R.

8—4, 55; 260—47; 264—78